United States Patent
Breau et al.

(10) Patent No.: US 9,215,253 B1
(45) Date of Patent: *Dec. 15, 2015

(54) METHOD, DEVICE, AND SYSTEM FOR REAL-TIME CALL ANNOUCEMENT

(71) Applicant: Sprint Spectrum L.P., Overland Park, KS (US)

(72) Inventors: Jeremy R. Breau, Leawood, KS (US); Jason R. Delker, Olathe, KS (US); Manish Mangal, Plano, TX (US); Mathew Oommen, Frisco, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/861,586

(22) Filed: Apr. 12, 2013

Related U.S. Application Data

(63) Continuation of application No. 12/757,301, filed on Apr. 9, 2010, now Pat. No. 8,441,962.

(51) Int. Cl.
*H04L 29/06* (2006.01)
*H04L 12/14* (2006.01)
*H04M 15/00* (2006.01)
*H04W 4/16* (2009.01)

(52) U.S. Cl.
CPC ........ *H04L 65/1006* (2013.01); *H04L 12/1407* (2013.01); *H04L 65/1069* (2013.01); *H04L 65/1096* (2013.01); *H04M 15/66* (2013.01); *H04W 4/16* (2013.01)

(58) Field of Classification Search
CPC .................................................. H04L 12/1407
USPC .................................................. 370/259–266
See application file for complete search history.

(56) References Cited

U.S. PATENT DOCUMENTS

| | | | |
|---|---|---|---|
| 6,671,262 B1 * | 12/2003 | Kung et al. | 370/260 |
| 6,771,639 B1 * | 8/2004 | Holden | 370/352 |
| 6,987,765 B2 | 1/2006 | March et al. | |
| 7,075,918 B1 | 7/2006 | Kung et al. | |
| 7,376,710 B1 * | 5/2008 | Cromwell et al. | 709/219 |
| 7,460,652 B2 | 12/2008 | Chang | |
| 7,586,657 B2 * | 9/2009 | Ohga | 358/518 |
| 7,586,857 B2 | 9/2009 | Ejzak et al. | |
| 7,586,899 B1 * | 9/2009 | Mohaban et al. | 370/352 |
| 7,602,901 B1 | 10/2009 | Kates et al. | |
| 7,636,431 B2 * | 12/2009 | Williams et al. | 379/221.13 |

(Continued)

FOREIGN PATENT DOCUMENTS

WO  WO 01/41411 A2  6/2001

*Primary Examiner* — Andrew Lai
*Assistant Examiner* — Andrew C Lee

(57) ABSTRACT

A method and corresponding device and system to provide a real-time call announcement to a called device. According to the method, a called device begins receiving call announcement media without having first engaged in session setup signaling to set up a session through which to receive the call announcement media. In normal operation, the device would disregard such incoming media, since no session has been set up for receiving the media. As disclosed, however, the device will also receive at about the same time a call setup request that seeks setup of the underlying call, and the device will treat its receipt of that call setup request as a key to allow playout of the call announcement media even though no session has been set up for receipt of the call announcement media. The called device will then play out the call announcement media as an announcement for the call.

19 Claims, 3 Drawing Sheets

(56) References Cited

U.S. PATENT DOCUMENTS

| | | |
|---|---|---|
| 7,664,102 B1 | 2/2010 | Samarasinghe |
| 7,792,973 B2 | 9/2010 | Gallant et al. |
| 7,920,547 B2 | 4/2011 | Lim |
| 8,369,311 B1 * | 2/2013 | Kirchhoff et al. ............ 370/352 |
| 8,593,959 B2 * | 11/2013 | Hepworth et al. ............ 370/231 |
| 2001/0012348 A1 | 8/2001 | Latter et al. |
| 2002/0037735 A1 * | 3/2002 | Maggenti et al. ............ 455/517 |
| 2002/0094081 A1 | 7/2002 | Medvinsky |
| 2002/0102999 A1 * | 8/2002 | Maggenti et al. ............ 455/518 |
| 2002/0184373 A1 * | 12/2002 | Maes ............ 709/228 |
| 2003/0002657 A1 | 1/2003 | Seelig et al. |
| 2003/0007497 A1 * | 1/2003 | March et al. ............ 370/410 |
| 2003/0086558 A1 | 5/2003 | Seelig et al. |
| 2003/0187658 A1 | 10/2003 | Selin et al. |
| 2004/0161083 A1 * | 8/2004 | Crockett et al. ............ 379/93.23 |
| 2005/0025180 A1 * | 2/2005 | Curcio et al. ............ 370/468 |
| 2005/0237931 A1 * | 10/2005 | Punj et al. ............ 370/229 |
| 2007/0088836 A1 | 4/2007 | Tai et al. |
| 2007/0140219 A1 * | 6/2007 | Diroo et al. ............ 370/352 |
| 2007/0291775 A1 * | 12/2007 | Frantz ............ 370/401 |
| 2007/0294425 A1 * | 12/2007 | Sobti et al. ............ 709/231 |
| 2008/0013531 A1 | 1/2008 | Elliott et al. |
| 2008/0192736 A1 | 8/2008 | Jabri et al. |
| 2009/0022283 A1 | 1/2009 | Pollitt |
| 2009/0034700 A1 | 2/2009 | Brunson et al. |
| 2009/0109957 A1 | 4/2009 | Caradec et al. |
| 2009/0191873 A1 | 7/2009 | Siegel et al. |
| 2010/0008232 A1 * | 1/2010 | Zave ............ 370/241 |
| 2010/0080371 A1 | 4/2010 | Gupta et al. |
| 2010/0238842 A1 * | 9/2010 | Narayanan et al. ............ 370/261 |
| 2011/0032928 A1 | 2/2011 | Gallant et al. |

* cited by examiner

METHOD, DEVICE, AND SYSTEM FOR REAL-TIME CALL ANNOUCEMENT

BACKGROUND

Since inception, telephones have been equipped with a bell or other audible device, e.g., a "ringer" to alert their users of an incoming call. Today, telephones are equipped with audible devices that play ringtones to alert their users of an incoming call and/or message. These audible devices, which are especially predominant among mobile (e.g., cellular) telephone technologies, commonly support a variety of resident, preprogrammed ringtones that a user of a receiving telephone can select, amend, and/or alter. Modern telecommunication and/or computer networks allow users to download an ever-increasing library of ringtones, thereby providing a wide degree of flexibility, control and personalization, thus changing an otherwise neutral device into something personal, and, in many cases, endearing.

More recently, and again, more predominantly in mobile telephone technologies, a user of a receiving telephone is now able to manually associate the resident, programmed ringtones to a particular calling party's phone number. This way, when a call that has an associated ringtone is terminated to the receiving telephone, the receiving telephone may play the associated ringtone.

To facilitate this in traditional phone systems, the receiving telephone receives information, such as the calling-party's phone number and name, from a telecommunications network that is relaying the call. This information may be relayed to the receiving telephone using, for example, the well-known caller-line identification ("Caller ID") service, which allows the information to be displayed as textual information (i.e., Caller ID text) to the user of the receiving telephone. In addition to displaying the information, the receiving telephone may match the Caller-ID information to an associated ringtone, and then play the associated ringtone to allow the user of the receiving telephone to identify (and/or determine whether to answer the call from) the calling party without needing to look at the Caller ID text.

This arrangement has several shortcomings. First, the calling party cannot influence the ringtone. That is, the ringtone is determined by the receiving party. This happens because the receiving party (i) chooses a telephone model from a wide variety of telephone models, which generally limits the available ringtones (preprogrammed or otherwise); (ii) selects a ringtone from the available ringtones based on, for the most part, personal choices, and then (iii) associates the selected ringtone to a given calling party phone number.

Second, the receiving party must manually associate a ringtone for each potential calling party to identify each calling party. Thus, the receiving telephone will use a default or generic ringtone for calling party numbers that do not have an associated ringtone. Third, if the user wishes to uniquely identify each calling party, then the user has to associate a different ringtone to each calling party number. Fourth, although a wide variety of ringtones exist, each telephone model generally limits the available ringtones (preprogrammed or otherwise).

Still more recent advances have now made it possible for telephone devices to operate as nodes on a packet-switched network (such as the Internet) and to engage in voice-over-IP (VoIP) or other packet-based communication. With such an arrangement, the calling and called devices may engage in packet-based call setup signaling in order to set up a packet-based call session, and the devices may then exchange real-time packet-based media streams (e.g., voice and/or video) with each other.

For instance, the devices may engage in call setup signaling according to the well known Session Initiation Protocol (SIP) in order to set up a packet-based real-time media session according to the well known Real-time Transport Protocol (RTP), and the devices may then exchange voice or other media with each other as a stream of RTP packets.

In particular, when a user of the calling device requests placement of a call to the called user, the calling device may transmit to a "SIP address" of the called user a SIP "INVITE" message requesting establishment of a packet-based real-time media session (e.g., RTP session) for the call. The SIP INVITE may also specify proposed session parameters such as a media coding scheme, and may identify the actual network address (e.g., IP address) and RTP port at the calling device. A SIP proxy server in the network may then consult SIP registration data to determine the network address where the called SIP address is currently registered, and the SIP INVITE may be routed to that network address.

Upon receipt of the SIP INVITE, the called device may play a ringtone (e.g., default or pre-associated with the calling user) to alert the called user. Once the called user answers the call (e.g., takes the called device off hook), the called device may then transmit to the calling device a SIP "200 OK" message expressing agreement to participate in the session, and typically designating an actual network address and RTP port at the called device. The calling device may then transmit a SIP "ACK" to the called device to confirm that the RTP session is established and ready to begin. The calling device may then begin to transmit to the actual network address/port of the called device an RTP packet stream representing real-time media such as voice or video from the calling user, and the called device may likewise transmit to the actual network address/port of the calling device an RTP packet stream representing real-time media from the called user.

OVERVIEW

Given the ability for devices to engage in packet-based call setup signaling and packet-based real-time media communication with each other, it would be advantageous to provide a packet-based real-time call announcement system in which a called party receives and plays out a custom voice or video call announcement at the time of call setup. Such a system could in theory overcome some of the above discussed problems with the traditional call alert process. For instance, with such a system, the calling device may transmit to the called device at the time of call setup an RTP audio stream that provides a voice announcement such as "Hey Joe, it's Jonny calling," and the called device may play that voice announcement for a user to hear. In this way, the calling user may exert control over what call announcement is provided to the called user, and the caller may tailor the call announcement to the particular call.

A problem with providing such a real-time call announcement service, however, is that, in order for the called device to receive the call announcement media stream in the first place, the called device would need to engage in setup signaling to establish a session through which to receive the call announcement media stream. Considering SIP and RTP for instance, the calling and called devices may need to engage in a complete SIP INVITE/OK/ACK transaction in order to set up an RTP session through which the called device can receive an RTP based call announcement. Further, the calling and called devices would have to engage in another SIP INVITE/OK/ACK transaction to set up the underlying call itself. Ultimately, carrying out two separate call setup signaling processes like this may impractically delay call setup.

Accordingly, disclosed herein is an improved method to provide a real-time call announcement. According to the method, a called device will begin receiving call announcement media (e.g., an RTP stream) without having first engaged in session setup signaling to set up a session through which to receive the call announcement media. In normal operation, the device would disregard such incoming media (e.g. incoming RTP packets), since no session has been set up for receiving the media. According to the present method, however, the device will also receive at about the same time a call setup request (e.g., SIP INVITE) that seeks setup of the underlying call, and the device will treat its receipt of that call setup request as a key to allow playout of the call announcement media even though no session has been set up for receipt of the call announcement media. The called device will then play out the call announcement media as a call announcement for the call.

This as well as other aspects, advantages, and alternatives will become apparent by reading the following detailed description with reference where appropriate to the accompanying drawings. Further, it should be understood that this overview and the other discussion provided in this document is provided merely by way of example and should not be viewed as limiting.

DETAILED DESCRIPTION OF AN EXAMPLE IMPLEMENTATION

Figure 1:
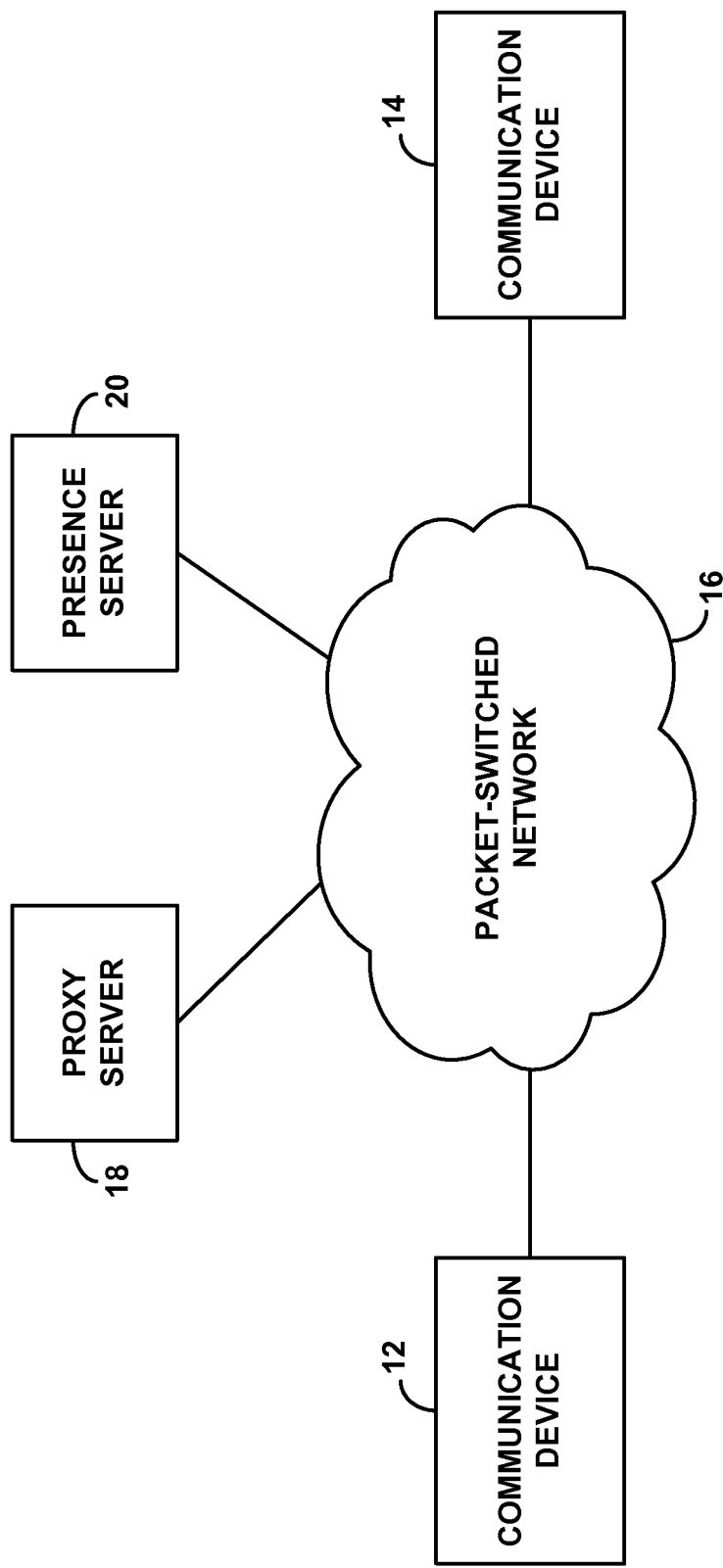
FIG. 1 is a simplified block diagram of a communication system in which an embodiment of present method can be implemented

In practice, a communication device that functions as the called device in accordance with the present method may operate as a node on a packet-switched network and may thus have an address on the network at which the device can receive incoming packets carrying signaling and/or media traffic. Further, the device may have a logical port at its network address, at which the device may be set to receive a particular type of traffic such as an RTP packet stream for instance. By convention, however, the device may be arranged to normally disregard any packets arriving at that port unless and until the device has engaged in session setup signaling to complete setup of a session through which to receive the packets.

According to the present method, the called device will determine that call announcement media (e.g., an RTP packet stream) received by the device corresponds with a call setup signaling message received by the device, and the called device will responsively play out the call announcement media as a call announcement for that call. One way to establish correspondence between the call announcement media and the call setup request is to detect a common signaling parameter (e.g., common source address, common session identifier, or other common parameter) in both the call announcement media and the call setup request. For instance, a call setup signaling message (e.g., SIP INVITE) that the device receives may contain a call identifier (e.g., an RTP synchronization source (SSRC) identifier), and call announcement media that the device receives may designate (or otherwise be correlated with) the same identifier. The called device may thus use the common call identifier as a basis to correlate the received call setup signaling message with the call announcement media, and to thereby determine that the device should play out the call announcement media as an announcement for the call, and the device may therefore play out the call announcement media for presentation to a user.

As noted above, the called device will preferably receive the call setup request at about the same time as the device receives the call announcement media. The call announcement media will preferably arrive at the called device as a real-time media stream such as an RTP stream. In practice, some or all of that stream may arrive at and be buffered by the called device just before the called device receives the corresponding call setup request message, and when the device receives the corresponding call setup message, the device may then begin playout of the buffered media. If the device buffers such incoming media and does not receive a corresponding call setup request message within a given time period (e.g., based on the buffer size), the device may discard the buffered media.

Alternatively, the call announcement media may begin arriving at the same moment that the device receives the call setup request message. Still alternatively, the call announcement media may begin arriving just after the device receives the call setup request message but still before setup of the call is complete. In that case, once the device determines that the incoming call announcement media is associated with the received call setup request, the device may begin playing the incoming call announcement media. Further, in the even the device has already begun playing a default ringtone in response to receipt of the call setup request, the device may transition to playing the incoming call announcement media instead. It is also possible that the device could play a real-time call announcement together with a default ringtone, by playing the two concurrently (e.g., with one functioning as background music to the other).

As also noted above, SIP signaling is conventionally used between two parties not only to allow the parties to agree on session parameters, but also to allow the parties to discover each other's actual network addresses and RTP ports, so that the parties can then transmit RTP packets to each other. With the present method of providing a real-time call announcement without first engaging in session setup signaling to establish a session through which to convey that media stream, an issue is how the calling device would know where to send the call announcement media for receipt by the called device.

As presently contemplated, one solution to this problem is for the called device to publish its address/port information for receipt by the calling device. For instance, when the called device gains network connectivity, the called device may send to a network presence server a notification message (e.g., a SIP NOTIFY message), specifying the called device's IP address and RTP port. In turn, the presence server may send that address/port information in a notification message (e.g., a SIP NOTIFY message) to the calling device per a subscription (e.g., SIP SUBSCRIBE) from the calling device. The calling device may then store the received address/port information in a presence record (e.g., contact record) that the calling device maintains for the called device.

The called device may further use this process to notify the calling device what session parameters (e.g., voice coding scheme) the called device prefers to use, unless such information is already known to the calling device or is not pertinent. For instance, the called device may include session parameter information in its notification message to the presence server, and the presence server may in turn include that session parameter in its notification message to the calling device. Thus, when the calling device subsequently seeks to initiate a call to the called device, the calling device can do so in accordance with the preferred session parameters.

In accordance with the method, the called device will preferably receive and begin playing out the call announcement media before the called device transmits a response to the call setup request. For instance, upon receipt from a calling device of a SIP INVITE seeking to set up a call with the called device and receipt of an incoming RTP media stream, the called device may determine that the SIP INVITE corresponds with the RTP media stream. In response, the called device may then begin playing out the call announcement media to a user of the called device before the called device transmits a responsive SIP 200 OK to the calling device. Optimally, once the user of the called device answers the call, the called device may responsively discontinue playout of the call announcement media (if it is still being played) and complete call setup signaling to allow the call to proceed.

If playout of the received call announcement media ends before the a user of the called device answers the call, the called device may automatically repeat playout of the call announcement media or may revert to presenting a default call alert (e.g., a default ringtone, whether audible, visual, tactile, or some other form).

Referring now to the drawings, as noted above, FIG. 1 is a simplified block diagram of a communication system in which the exemplary method can be implemented. It should be understood, however, that the arrangements and functions described herein are examples only, and other elements (e.g., device elements, functions, orders of functions, etc.) can be used instead and some elements may be omitted altogether. Further, those skilled in the art will appreciate that many of the elements described herein are functional in nature and may thus be implemented as discrete components or in conjunction with other components, in any suitable combination and location, and that various functions described can be implemented by hardware, firmware, and/or software. For instance, various functions can be implemented by a computer processor executing program logic in data storage or by a dedicated digital signal processor or the like.

As shown in FIG. 1, the example system includes two representative devices 12, 14 sitting as nodes on a packet-switched network 16, so that the devices can engage in packet-switched communication (e.g., IP communication or ATM communication) with each other via the network. The assumption in this arrangement is that each of the devices 12, 14 has an address on the network and can thus send packet communications from its address and receive packet communications destined to its address. In practice, an address can be a globally routable address or a local address possibly subject to network address/port translation. Further, each device's network address may be statically assigned or dynamically assigned in a known manner.

Each of the representative devices is preferably arranged to be able to engage in both packet-based call setup signaling and packet-based real-time media communication. Such signaling and media communication may comply with any of a variety of protocols. By way of example, the signaling communication may comply with SIP, as set forth by The Internet Society Request for Comments 3261, published June 2002, and the real-time media communication may comply with RTP, as set forth by The Internet Society Request for Comments 3550, published July 2003. Variations of these protocols, and other protocols now known or later developed, could be used as well.

The connection between each device and network 16 can take various forms, and the devices themselves can take various forms. For example, a representative device can be connected by a landline link such as a broadband (e.g., cable modem or DSL) or dial-up Internet connection, and the device may be a landline connected telephone (e.g., VoIP telephone) or a computer or other device equipped to operate over such as connection and to engage in applicable signaling and traffic communication. As another example, a representative device can be connected by a wireless link such as a WiFi or cellular wireless connection, in which case the device may be a wireless connected telephone such as a cellular telephone or a computer or other device equipped to operate over that connection and to engage in applicable signaling and traffic communication. If the device communicates over a cellular wireless link, the link may include a radio access network arranged to provide the device with wireless packet-data connectivity according to any of a variety of cellular wireless protocols, examples of which include without limitation CDMA (e.g., 1xRTT, 1xEV-DO), iDEN, WiMAX (e.g., IEEE 802.16), TDMA, AMPS, GSM, GPRS, UMTS, EDGE, LTE, and associated variations now known or later developed.

A representative device need not be a "telephone" specifically but can more generally be any communication device adapted to carry out functions of the present method. Accordingly, the "call" that is involved in the method may be a voice call or may take other forms, and may be packet-based or circuit-based. For example, the call may be a video conference, in which case the participating devices may be computers or video conferencing stations arranged to engage in video conferencing with each other. As another example, the call may be a push-to-talk (PTT) session, in which case the participating devices may be cellular wireless devices supporting PTT functionality. Further, the call at issue may involve more than two parties, such as where a calling device invites multiple parties to participate in a group call. Other examples are possible as well.

Network 16 may also take various forms. By way of example, the network may be the global Internet, a private packet-switched network, or a combination of those or other networks. Further, while the network preferably supports communication of packet-based signaling and traffic, such as SIP signaling and RTP traffic, the network may also include circuit-switched components. Yet further, the network may include wired and/or wireless portions and any of a variety of network components, such as routers, switches, gateways for instance.

Shown sitting as additional nodes on network 16 are a SIP proxy server 18 and a presence server 20. Generally, proxy server 18 may function to receive and forward SIP signaling messages. For instance, as noted above, the proxy server may receive a SIP message destined to a particular SIP address and may consult with a SIP registry to map the SIP address to an IP address at which the SIP address is currently registered, so that the SIP message can be forwarded to that IP address. An exemplary SIP proxy server may take the form of an Internet Multimedia Subsystem (IMS) Call Session Control Function (CSCF) for instance, which may work in conjunction with one or more other IMS functions.

Presence server 20 may function to maintain and manage presence (status) information about various devices, and to provide presence notifications serving to notify devices about each other's status. A traditional function of such a presence server is to be notified when a device goes online or offline and to responsively notify that device's "buddies" of the online/offline status of the device, so as to facilitate instant messaging and the like. But a presence server can be arranged to manage assorted presence information not limited to online/offline status, including for instance location, busy/available, and other types of information. Presence server 20 may operate using SIP presence extensions as defined by The Internet Society Request for Comments 3428, published December 2002. As such, presence server 20 may receive a SIP SUBSCRIBE from a device wishing to be notified of the presence status of another device and may store a record of that subscription. Presence server 20 may then receive a SIP NOTIFY from the other device indicating the presence status of the other device, and the presence server may then send a SIP NOTIFY to the subscribed device to provide notification of the updated status.

Figure 2:
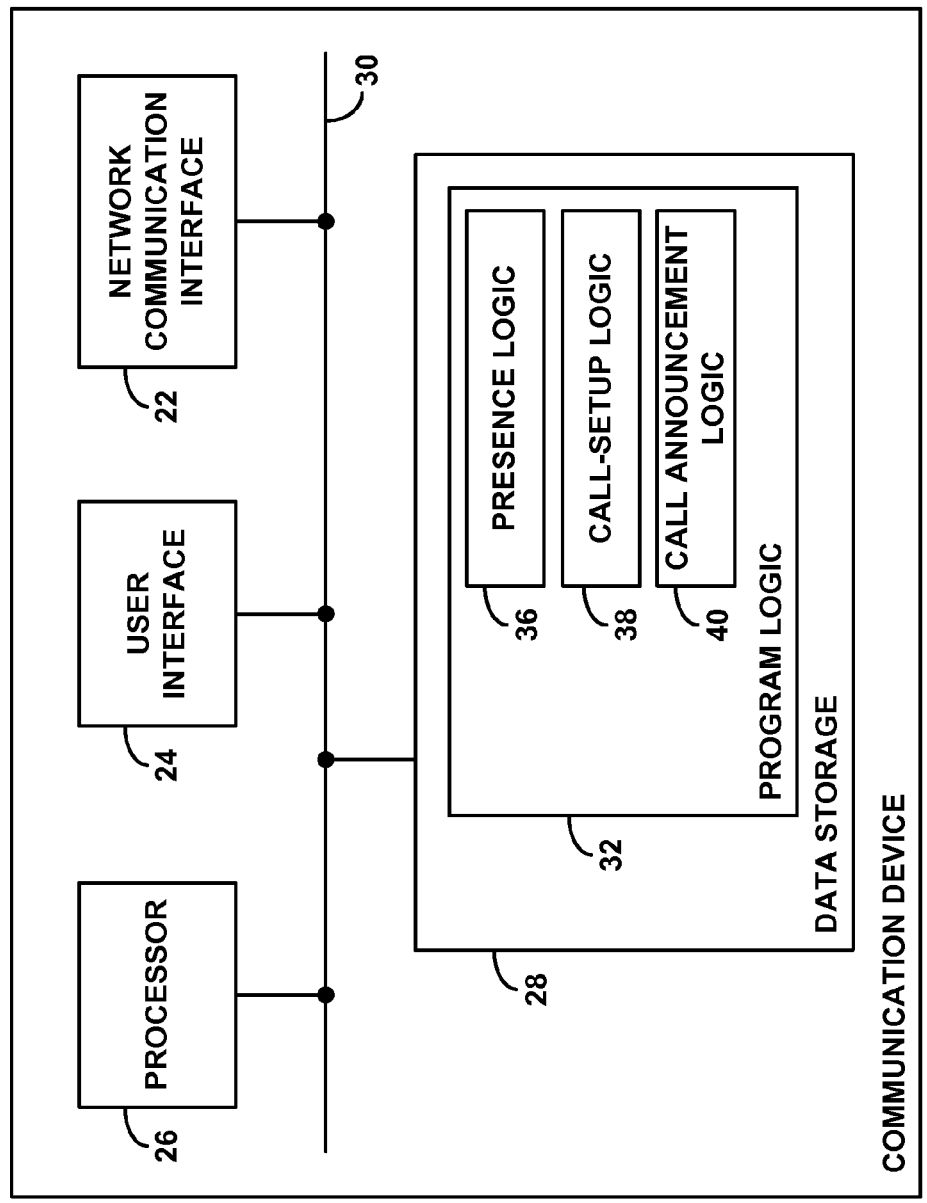
FIG. 2 is a simplified block diagram depicting functional components of a device operable within the arrangement of FIG. 1.

FIG. 2 is next a simplified block diagram showing functional components of a representative device, such as device 12 or 14 for instance. As shown, the representative device includes a network communication interface 22, a user interface 24, a processor 26, and data storage 28, all of which may be communicatively linked together by a system bus, network, or other connection mechanism 30.

Network communication interface 22 functions to facilitate communication on packet-switched network 16, such as to send and receive SIP signaling messages and to send and receive RTP packet streams defining real-time media. As such, network communication interface 22 may take various forms.

For example, if the device is a landline-connected device, the network communication interface may comprise a wired Ethernet network interface module, which may couple by an Ethernet cable with a broadband modem or the like. As another example, if the device is a cellular wireless connected device such as a cell phone, the network communication interface may comprise a wireless communication module of the type available from Qualcomm Incorporated, together with one or more antennas for engaging in radio-frequency communication according to a protocol such as one of those noted above.

Network communication interface 22 preferably has an address on network 16. As noted above, this address can be a static address or a dynamically assigned address and can be a globally routable address or a local address subject to address translation or the like. In the preferred embodiment, the network address is an IP address, but other types of addresses are possible as well. Generally, the device can engage in packet-switched communications (e.g., SIP signaling and RTP packet communication) to/from this address. To facilitate such communications, the network interface or the device generally may be programmed with a logical stack (e.g., an Open System Interconnection (OSI) stack) that defines how the device will engage in physical, data-link, network, transport, session, and application layer communications for instance.

As shown in the figure, network communication interface also preferably defines various logical ports at the device's network address, and each port may be associated with a particular type or class of communication so as to facilitate convenient handling by application layer functions of the device. For instance, one such port may be designated for receiving SIP packets, and another such port may be designated for receiving RTP packets. In an example implementation of the present method, a special port may be designated as a "call announcement" port for receiving an RTP packet stream representing call announcement media. Alternatively, a single port may be designated for RTP packet communication generally, including RTP call announcement packets and other RTP packets. In practice, a packet can be transmitted to a particular port of the device by addressing and routing the packet to the device's network address/port. When the device receives such a packet at its network address, the device may then pass the packet to handler logic associated with the designated port.

User interface 24 preferably includes components for receiving input from and providing output to a user of the device. For instance, the user interface 24 may include a keypad, touch-sensitive screen, microphone, and camera for receiving user input, and a display screen and speaker for providing user output. Further, the user interface 24 may include analog/digital conversion circuitry to facilitate conversion between analog user input/output and digital signals on which the device can operate. In practice, the device may thus receive analog user input (e.g., voice) and digitize the input to produce a digital bit stream, and the device may then compress or otherwise encode the digital bit stream and packetize the resulting bit stream for transmission to another device. Likewise, the device may receive from another device a set of packets representing media from the other device, depacketize and decode the packet payload to recover a digital bit stream, and then convert the digital bit stream to analog form for playout to a user.

Processor 26 preferably comprises one or more general purpose processors (such as INTEL processors or the like) and/or one or more special purpose processors (such as digital signal processors or application specific integrated circuits). To the extent processor 26 includes more than one processor, the processors could work separately or in combination. Data storage 28, in turn, comprises one or more volatile or non-volatile storage components, and data storage 28 can be integrated in whole or in part with processor 26, with network communication interface 22, or with other aspects of the device.

As shown, data storage 28 contains (or is arranged to contain) program logic 32, which may comprise machine language instructions or other types of instructions that are executable by processor 26 to carry out various device functions described herein. (Such logic could alternatively be embodied in the device in other forms but would in any event define functions carried out by the specific machine that is the communication device at issue.)

For purposes of operating as a called device, for example, the program logic may define presence logic 36, call-setup logic 38, and call-announcement logic 40.

Presence logic 36 functions to publish address and port information for use by calling devices to be able to transmit call announcement media to the called device at the time of call setup. As such, presence logic 36 may employ SIP presence extensions and may communicate via network 16 with presence server 20 to notify presence server 20 when the called device acquires an IP address or goes online. As noted above, presence server 20 may then publish that information to subscribing devices, so that such a device may then transmit call announcement media to the IP address and port of the called device without the need for the devices to first engage in call setup signaling to establish a session through which the media can be conveyed. (Note that the "port" may be a conventional TCP/UDP port or may actually be a separate IP address at the called device. If the port is a separate IP address at the device, then that address alone may be used as the address to which call announcement media is sent, with or without a further port designation.)

Call-setup logic 38 functions to manage call setup signaling, such as to receive and process call setup requests that seek call setup with the device, and to generate and send call setup messages. Call-setup logic 38 may employ SIP signaling for this purpose. Alternatively, call-setup logic could use other signaling protocols, such as H.323 for instance. Using SIP, by way of example, the call-setup logic may receive via network communication interface 22 a SIP INVITE that seeks setup of a call from a calling device to the called device. The call-setup logic may then invoke call-announcement logic 40 to trigger a call announcement for the requested call. When a user of the device answers the call, call-setup logic 38 may then generate and transmit to the calling device a SIP 200 OK to accept the call request, and call-setup logic 38 may then receive a SIP ACK indicating completion of call setup, and the device may then be prepared to receive and send RTP traffic for the call.

Call-announcement logic 40 in turn functions to manage playout of call-announcement media in accordance with the present method. In this regard, the call-announcement logic may normally operate to play a default ringtone (e.g., a general ringing melody or a ringtone pre-associated with the caller) in response to receipt of a call setup request from a calling device. However, in accordance with the present method, the call-announcement logic will further operate during the call setup process to detect whether a received call setup request message corresponds with received call announcement media and, if so, to play out the call announcement media as a call announcement for the call.

As noted above, the device will normally operate to disregard media (e.g., RTP packets) that the device receives at its call announcement port (or general RTP port) if the device has not yet engaged in setup signaling to establish a session through which the device will receive that media. However, in accordance with the method, if the received media (e.g., RTP packets) correspond with a received call setup request (e.g., SIP INVITE), then the device will switch from that default mode of operation to a call-announcement mode in which the device will play the received media as a call announcement before the device transmits to the calling device a response (e.g., SIP 200 OK) to the received call setup request. More generally, the device (e.g., call-announcement logic 40) will switch to this real-time call-announcement mode in response to the call-setup logic 38 receiving a call-setup request from a sender of media that the device receives at a particular port, and the device will thus play out the received media as a call announcement before the device transmits to the sender a response to the received call-setup request. The real-time call announcement may thus provide the called user with a custom audio and/or video announcement, such as an announcement of the name of the calling user for instance.

For purposes of operating as a calling device, the program logic 32 may similarly include presence logic, call-setup logic, and call-announcement logic. However, these logic functions may differ in some ways for purposes of being able to place calls and send real-time call announcements.

For example, the presence logic may function to subscribe to receive presence notifications and may thus receive and store published address and port information for a device so as to then be able to send call announcement media to that device when later placing a call to that device.

As another example, the call-announcement logic may function to allow a user of the device to enter call announcement media to be transmitted as a real-time call announcement to the called device. In practice, for instance, the call-announcement may prompt a user to speak a call-announcement into the device, and the call-announcement logic may cause the device to transmit that spoken call-announcement to the called device during setup of a call to the called device. The call-announcement logic in the calling device may function to trigger this prompt whenever the calling device receives from a user a request to place a call to a called device for which the calling device possesses address and port information, so that the calling device can then transmit the user-provided call-announcement to that address and port, without having first engaged in setup signaling to establish a session through which to send the call-announcement media. Other example variations are possible as well.

Figure 3:
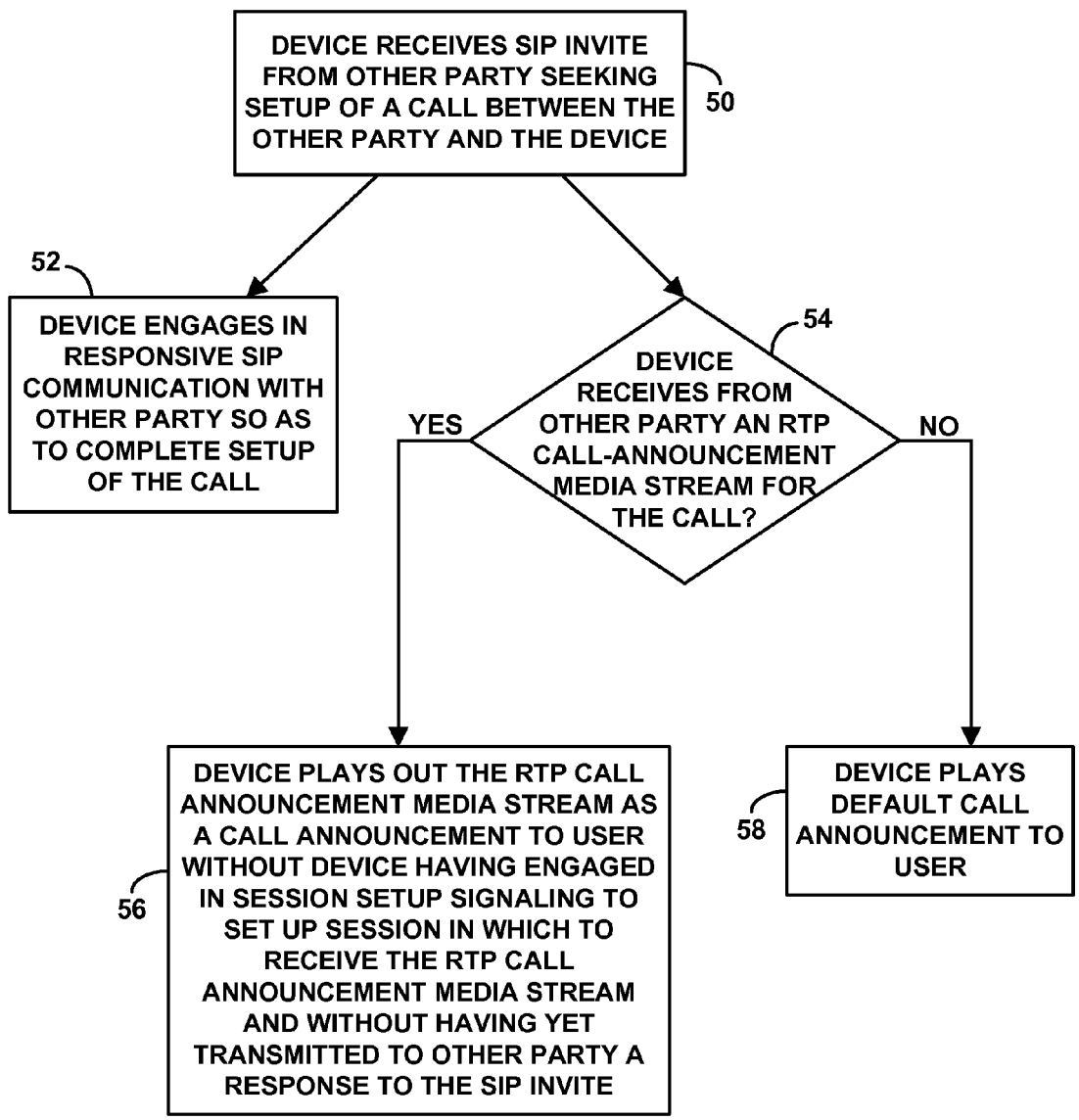
FIG. 3 is a flow chart depicting functions that can be carried out in accordance with an exemplary embodiment of the method.

Referring now to FIG. 3, a flow chart is provided to depict functions that can be carried out by an example called communication device in accordance the present method. As noted above, the called device normally disregards incoming RTP media if the device has not yet engaged in session setup signaling to set up a session in which to receive the RTP media.

As shown in FIG. 3, at block 50, the device receives a SIP INVITE from another party seeking setup of a call between the other party and the device. At block 52, the device then engages in responsive SIP communication with the other party so as to then complete setup of the call. Further, at block 54, the device makes a determination of whether the device receives from the other party an RTP call-announcement media stream for the call. If the determination is that the device receives from the other party an RTP call announcement media stream for the call, then, at block 56, the device plays out the RTP call announcement media stream as a call announcement to a user of the device without the device having engaged in session setup signaling to set up a session in which to receive the RTP call announcement media stream and without having yet transmitted to the other party a response to the SIP INVITE. On the other hand, if the determination is that the device does not receive from the other party an RTP call announcement media stream for the call, then, at block 58, the device plays out a default call announcement to the user of the device.

As noted above, the device can determine that a received SIP INVITE corresponds with received (e.g., incoming) RTP packets by determining that the SIP INVITE and the RTP packets carry a common identifier, such as a common SSRC for instance. The common identifier may be set forth in the SIP INVITE in a specific header parameter. Likewise, the common identifier may be set forth in each RTP packet in an RTP header. Other types of correlating data or correlating mechanisms could be used instead.

An exemplary embodiment has been described above. Those of ordinary skill in the art will appreciate, however, that numerous modifications may be made while remaining within the scope of the invention as defined by the claims.

We claim:

1. A method carried out by a communication device, wherein the communication device normally disregards incoming Real-time Transport Protocol (RTP) media if the communication device has not engaged in session setup signaling to set up a session in which to receive the RTP media, the method comprising:

receiving, by the communication device, a Session Initiation Protocol (SIP) INVITE message from a calling party seeking setup of a call between the calling party and the communication device, and engaging, by the communication device, in responsive SIP communication with the calling party so as to then complete setup of the call;

making a determination, by the communication device, of whether the communication device receives from the calling party a Real-time Transport Protocol (RTP) call announcement media stream for the call;

if the determination is that the communication device receives from the calling party an RTP call announcement media stream for the call, then playing out, by the communication device, the RTP call announcement media stream as a call announcement to a user of the communication device without the communication device having engaged in session setup signaling to set up a session in which to receive the RTP call announcement media stream, including without having yet transmitted to the calling party a response to the SIP INVITE message; and if the determination is that the communication device does not receive from the calling party an RTP call announcement media stream for the call, then playing out, by the communication device, a default call announcement to the user of the communication device.

2. The method of claim 1, wherein the determination is that the communication device receives from the calling party the RTP call announcement media stream for the call, wherein the SIP INVITE carries a session identifier, wherein the RTP call announcement media stream carries the session identifier, and wherein making the determination comprises using the session identifier to correlate the RTP call announcement media stream with the SIP INVITE message and thus with the call.

3. A communication device comprising:

a network communication interface for engaging in communication on a packet-switched network at an internet protocol (IP) address, the communication device having a logical port at the IP address;

Session Initiation Protocol (SIP) program logic including instructions executable by the communication device (i) to receive a SIP INVITE message from a calling party seeking setup of a call between the calling party and the communication device and (ii) to engage in responsive SIP communication with the calling party so as to then complete setup of the call;

Real-time Transport Protocol (RTP) program logic including instructions executable by the communication device to receive and play out packet-based real-time media arriving at the logical port, wherein the communication device normally disregards any RTP media stream received at the logical port unless and until the communication device has engaged in session setup signaling with a sender of the RTP media stream to set up a session for receipt of the RTP media stream; and call-announcement program logic including instructions executable by the communication device to manage call-announcement playout, wherein, according to the call-announcement program logic, if the communication device begins to receive at the logical port from the calling party an RTP call announcement media stream for the call before the communication device has transmitted to the calling party a response to the SIP INVITE message, the communication device responds to the SIP INVITE message by playing out the RTP call announcement media stream as a call announcement for the call even though the communication device has not engaged in session setup signaling with the calling party to set up a session for playout of the RTP call announcement media stream.

4. The communication device of claim 3, wherein, according to the call-announcement program logic, the communication device does not play out the RTP call announcement media stream unless the communication device first receives the SIP INVITE message for the call.

5. The communication device of claim 3, wherein, according to the call-announcement program logic, if the communication device begins to receive the RTP call announcement media stream and has not yet received the SIP INVITE message for the call, the communication device buffers the RTP call announcement media stream as the communication device awaits receipt of the SIP INVITE message, and (i) if the communication device does not then receive the SIP INVITE message, the communication device discards the buffered RTP call announcement media but (ii) if the communication device then receives the SIP INVITE message, the communication device begins to play out the buffered RTP call announcement media as the call announcement for the call.

6. The communication device of claim 3, wherein, according to the call-announcement program logic, the communication device plays a default ringtone in response to receipt of the SIP INVITE message if the communication device does not begin to receive from the calling party any RTP call announcement media stream for the call.

7. The communication device of claim 3, wherein the SIP INVITE message contains data specifying a session identifier for the call, and wherein the RTP call announcement media stream contains data specifying the session identifier, wherein, according to the call-announcement program logic, the communication device uses the session identifier to correlate the received SIP INVITE message with the RTP call announcement media stream so as to establish that the RTP call announcement media stream should be played out as the call announcement for the call.

8. The communication device of claim 7, wherein the session identifier is an RTP synchronization source identifier.

9. The communication device of claim 3, wherein, according to the call-announcement logic, the communication device discontinues playout of the RTP call announcement media stream upon a user of the communication device answering the call.

10. The communication device of claim 3, wherein the RTP call announcement media stream defines at least one type of media selected from the group consisting of audio and video, and wherein the RTP call announcement media stream as played out by the communication device announces to a user of the communication device a name of a calling user.

11. The communication device of claim 3, further comprising:

publishing program logic including instructions stored in the data storage and executable by the processor to publish the IP address and logical port for use to send call-announcement media to the communication device, wherein the RTP call announcement media stream received by the communication device is transmitted from the calling party to the published IP address and logical port.

12. The communication device of claim 3, further comprising a processor and data storage, wherein the SIP program logic, the RTP program logic, and the call announcement program logic comprise computer instructions stored in the data storage and executable by the processor.

13. A communication system including a communication device, the communication device comprising:
- a network communication interface for engaging in communication on a packet-switched network, the network communication interface having an address on the network and defining a port at the address;
- a processor;
- data storage;
- call-setup program logic including instructions stored in the data storage and executable by the processor to receive and process call-setup requests that seek call setup with the communication device; and
- media-management program logic including instructions stored in the data storage and executable by the processor to manage playout of a Real-time Transport Protocol (RTP) media stream that the communication device receives at the port,
- wherein the communication device has a default mode in which the communication device does not play out the RTP media stream that the communication device receives at the port,
- wherein the communication device has a call-announcement mode in which the communication device plays out the RTP media stream that the communication device receives at the port, and
- wherein the communication device switches from the default mode to the call-announcement mode in response to the call-setup logic receiving a call-setup request message from a sender of the received RTP media stream, and the communication device thus plays out the received RTP media stream as a call announcement before the communication device transmits to the sender a response to the received call-setup request message.

14. The communication system of claim 13, wherein the received call-setup request comprises a Session Initiation Protocol (SIP) INVITE message.

15. The communication system of claim 14, wherein the communication device receives the RTP media stream from the sender when the communication device receives the call-setup request from the sender.

16. The communication system of claim 15, wherein the received SIP INVITE message contains data specifying a session identifier for a call requested by the SIP INVITE message, and wherein the RTP media stream contains data specifying the session wherein the communication device uses session identifier to correlate the received SIP INVITE message with the received RTP media stream so as to establish that the received RTP stream should be played out as a call-announcement for a call requested by the SIP INVITE message.

17. The communication system of claim 16, wherein the session identifier is an RTP synchronization source identifier.

18. The communication system of claim 17, wherein the communication device discontinues playout of the received RTP media stream upon a user of the communication device answering the call.

19. The communication system of claim 17, further comprising the sender of the SIP INVITE message and of the RTP media stream,
- the communication device further comprising publishing program logic including instructions stored in the data storage and executable by the processor to publish the address and port,
- wherein the sender is arranged to receive and store the published address and port and to send the RTP media stream to the received published address and port.

* * * * *